Aug. 21, 1951     L. M. BAKER     2,564,662
PNEUMATIC TIRE CURING BAG AND METHOD OF MAKING SAME
Filed June 21, 1949
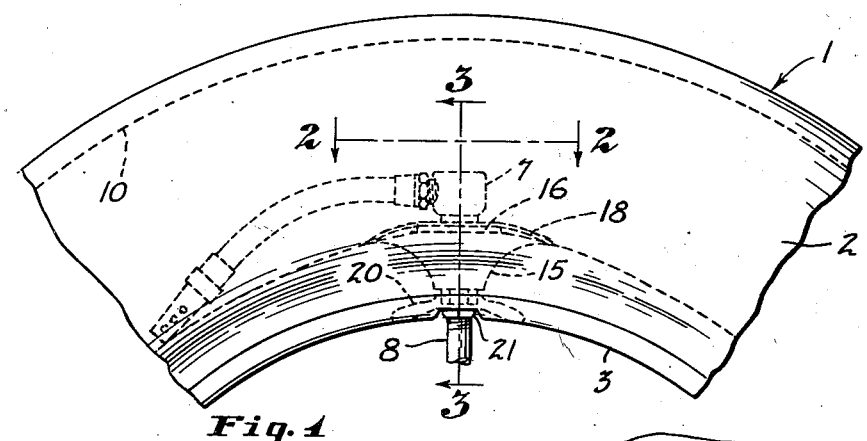
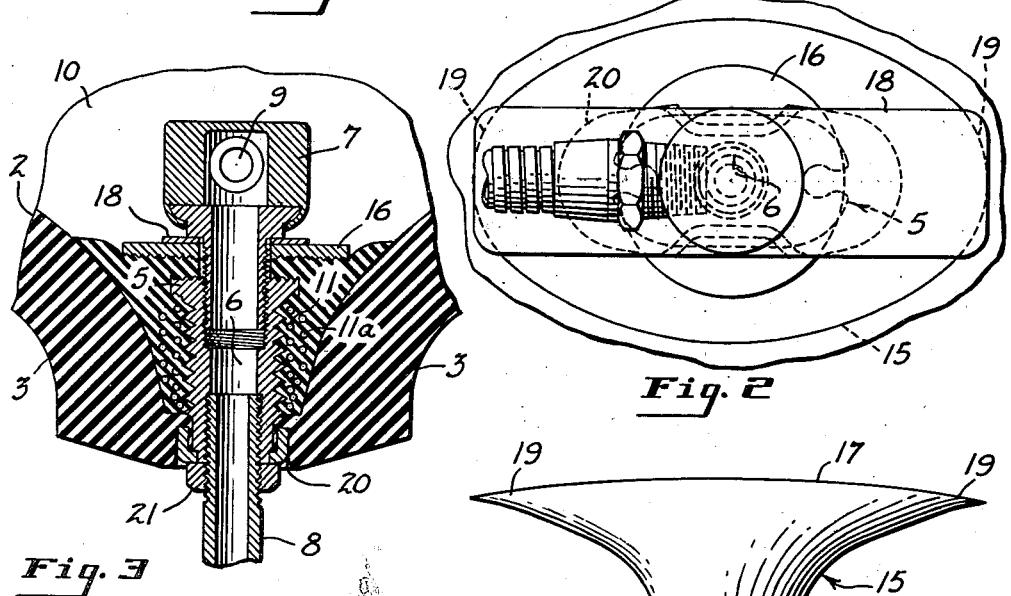
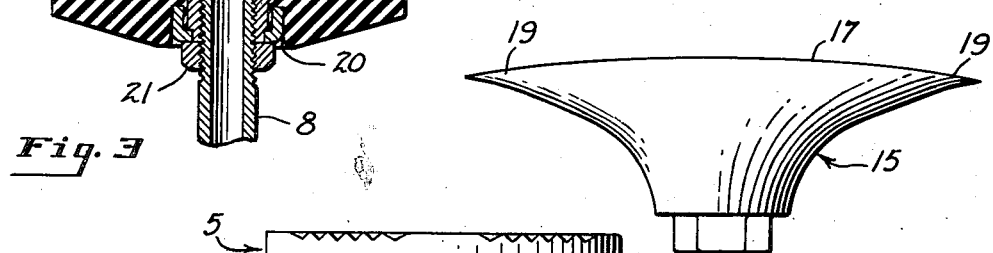
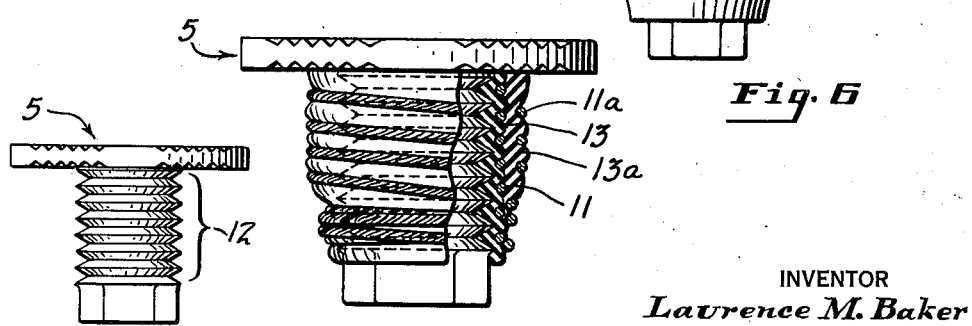
INVENTOR
*Laurence M. Baker*
BY *Evans + McCoy*
ATTORNEYS Patented Aug. 21, 1951

2,564,662

UNITED STATES PATENT OFFICE 2,564,662

PNEUMATIC TIRE CURING BAG AND METHOD OF MAKING SAME

Laurence M. Baker, Akron, Ohio, assignor to The General Tire and Rubber Company, Akron, Ohio, a corporation of Ohio Application June 21, 1949, Serial No. 100,509

8 Claims. (Cl. 18—45)

The present invention relates to improvements in air bags or curing bags suitable for use in the vulcanization of pneumatic tires. It particularly relates to improvements in such air bags which are largely constructed of a copolymer of isobutylene and a diolefinic compound having a preponderance of isobutylene and known in the trade as Butyl rubber.

Air bags have been manufactured through the years from natural rubber compounds and the like. They are incorporated within the uncured or green tire bands at the time when these bands are expanded from the relatively flat to the toroidal shape and are utilized both in the expansion step to hold the green tire in toroidal form before it is placed in the mold and as a shaping device to obtain a smooth surface of the desired shape when the tire is vulcanized. The bags have very thick walls in which is vulcanized a suitable metal tube having a passageway therethrough to the cavity of the air bag.

Steam or curing fluid is incorporated into the interior of the air bag during the curing of the tire to cause it to become heated to the vulcanization temperature.

The air bags or curing bags are utilized over and over again until failure occurs. In the case of natural rubber, failure usually occurs in less than 50 curing cycles. Butyl rubber on the other hand is able to withstand a great many vulcanizations without becoming too greatly deteriorated and may be subjected to as many as 1000 or 1500 separate curing cycles before the Butyl rubber of the air bag becomes unusable.

Butyl rubber, however, has very little tendency to adhere to metals and the rubber-to-metal adhesives proposed are not generally very effective in adhering Butyl rubber to metals, at least at vulcanizing temperatures. When, therefore, the Butyl rubber air bag is constructed in the same way as natural rubber air bag, separation occurs between the metal insert or tube vulcanized in the air bag walls to permit ingress and egress of the curing media. This results in time consuming and costly repairs at relatively short intervals and a great many of the advantages associated with the use of Butyl rubber air bags are lost.

It is an object of the present invention to provide a method of making Butyl rubber air or curing bags in which the solid inserts or tubes through the walls of the bag are strongly attached to the walls of the bag so that they do not become disengaged during the curing and rough usage associated therewith.

Another object of the present invention is to provide an air bag of Butyl rubber having exceptionally long life and having a solid insert for providing a passageway through the walls securely bonded to the walls of the air bag. Other objects will be apparent from the following description of the invention, as illustrated by the accompanying drawings, in which;

Figure 1 is an elevational view of a portion of an air bag embodying the present invention;

Figure 2 is a view of a portion of the bag of Figure 1 as seen from the line 2—2 of Figure 1;

Figure 3 is a sectional view through the critical portion of the air bag embodying the present invention taken on the line 3—3 of Figure 1;

Figure 4 is an elevational view of a metal insert usually of brass which is fastened into the walls of the air bags produced in accordance with the present invention;

Figure 5 is an elevational view with parts removed of the metal inserts shown in Figure 4 containing one or more layers of the rubber compound fastened over surface portions thereof by tension members in accordance with a subsequent step of the process of the present invention; and Figure 6 is a prevulcanized insert containing the metal member shown in Figures 4 and 5 bonded and prevulcanized to added Butyl rubber and suitable for incorporation into the walls of an air bag.

Referring particularly to the drawing in which like parts are designated by like numerals of reference through the several views, the air bags 1 of the present invention have relatively thick wall portions 2 and a bead forming portion 3 of a conventional shape and of a suitable Butyl rubber compound.

The interior of the pneumatic tire is adapted to bear against and contact the exterior surface of the relatively thick walls, and the beads of the tire are shaped between the surface of the conventional bead forming portion 3 and a suitable metal mold (not shown). The inner wall between the bead forming portions and having the least radius of curvature about the axis of the air bag is provided with any of the usual metal (generally brass) inserts 5 which may, as is generally the practice, have a plurality of undulations over the surface thereof to provide a larger effective area of contact for the rubbery polymer with which it is to come into adhesive contact.

Insert 5 has a passageway 6 therethrough and the walls of the passageway are suitably threaded to receive a conventional syphon attachment 7 and the connector 8 so heating fluid may pass in series through the tubular connector 8, the passageway 6 and the passageway 9 within the syphon element 7 to the annular cavity 10 of the air bag.

The present invention is based upon my discovery that the disadvantages and difficulties due to the relative lack of strength of bonds produced between Butyl rubber and the various metals may be overcome by disposing a plurality of tension members 11 such as a wire, a cable or a cord capable of withstanding repeated vulcanizations around that portion of the insert 5 containing the passageway 6 and spaced from the insert 5 within the Butyl rubber, that is closely adjacent to and surrounds the generally cylindrical surface 12 of the metal insert.

While surface 12 of the insert 5 is usually of generally cylindrical shape a cylindrical surface is not necessary. Surface 12 extends transversely of the wall of the air bag and has sufficient length to permit the tube 8 and the element 7 to be connected.

Metal cords or cable (both used here in an equivalent sense) are preferred tension members. Steel cord (or cable) brass plated is particularly satisfactory for the reason that a somewhat stronger bond is had to the rubbery material.

In the preparation of the air bags of the present invention the metal insert 5 having a generally cylindrical and serrated surface 12 is wound or covered with one or more layers 13 of curable Butyl rubber compound applied in sheet or strip form. The layer 13 is thereafter wound tightly with one or more (preferably a plurality) of turns of a suitable tension member 11 to hold the layer 13 firmly and tightly against the surface and to force the layer 13 into the serrations on the surface 12. If desired, one or more additional layers 13A may be superimposed over the composite layer of curable rubber compound 13 and tension members 11 and an additional number of turns or spiral 11A of tension members 11 may be tightly wound or tightly superimposed thereon as shown.

The metal insert 5 wound or covered as shown in Figure 5 with one or more layers of the vulcanizable Butyl rubber compound and one or more layers of tension members superimposed thereon may then be suitably covered with additional Butyl rubber compound and separately vulcanized in a preforming mold of any desired shape to provide a preform 15 as illustrated in Figure 6. The preforming step is desirable to provide relatively high molding pressure for the metal bonding operation. The layers of Butyl rubber are by the preforming operation firmly united to the layers 13 and 13A so that the entire mass of rubbery material becomes interlocked to the metal insert by the tension members 11 and 11A. A fluid tight contact with the generally cylindrical walls 12 of the insert 5 is thus maintained.

The preform 15 is preferably shaped as shown with side walls of exponentially diminishing thickness. The preformed member 15 is in accordance with customary practices with preformed members heretofore incorporated in a suitable cavity in the inner walls of the air bag. A washer 16 also having a serrated surface may be disposed against the outer surface 17 of the preform 15 and a spring 18 superimposed thereon to force the thin end portions 19 of the preform strongly against the walls of the bag. The spring 18 and the washer 16 may be held in place by the syphon element which is threaded into the tubular cavity or passageway of the insert 5 as shown. An outer facing member 20 is held by the nut 21 which is threaded onto tube 8 tightly against the adjacent external surface of the inner portion of the wall 2 adjacent to tube 8.

Upon curing the thus assembled green air bag the uncured Butyl rubber of the walls 2 are strongly adhered to the partially precured preform 15 which is thoroughly interlocked by means of the tension members 11 and 11A to the outer cylindrical surface 12 of the insert 5. The tension members 11 and 11A are wired around the generally cylindrical surface 12 and take the stress that heretofore caused separation between the surface 12 of the metal insert and the contacting Butyl rubber.

Air bags constructed in this manner, in accordance with the present invention, withstand an extensively large number of vulcanization cycles in tires without requiring expensive repairs. Since the air bags are quite costly to manufacture it is seen that the present invention materially reduces the cost of the curing operation of pneumatic tires.

The present invention is applicable to air bags made of any type of rubbery polymer such as natural rubber, neoprene and the like, but it is particularly applicable to Butyl rubber and rubbers of low unsaturation.

Butyl rubber is a copolymer of an isobutylene with a diolefinic compound and is specifically a copolymer of isobutylene with a conjugated diolefin of no more than 6 or 7 carbon atoms such as butadiene, isoprene, dimethylbutadiene, etc. It contains a relatively large proportion of units obtained from the polymerization of the isobutylene and generally contains less than 10% of the units derived from the conjugated diolefin. Because of the low diene content it has a very low amount of chemical unsaturation. It is this low unsaturation that gives Butyl rubber its exceptional aging properties at high temperatures and which makes adherence to metals so difficult.

It is also apparent that in accordance with the provisions of the patent statutes modifications of the invention may be made without changing the spirit thereof.

I claim:

1. In an air bag for incorporation in pneumatic tire casings during the curing thereof having an annular cavity defined by walls formed of a copolymer of isobutylene and a conjugated diolefinic compound and having a solid insert through said walls with a passageway therein to permit ingress and egress of inflation fluid, which solid insert has an outer surface that extends generally transversely to the walls of the air bag and is in fluid tight contact with such walls, the improvement which comprises a plurality of tension members surrounding said surface and embedded into said walls adjacent said surface to interlock said walls to said surface.

2. A method of making curing bags having side walls of a compounded rubbery copolymer of a major proportion of isobutylene and a minor proportion of a diolefin wherein said rubbery copolymer is shaped in generally toroidal form and a rigid member having a generally tubular portion with passageway therethrough is incorporated into a wall portion of said torus to provide a passageway for ingress and egress of curing fluid, which member has a surface surrounding said passageway that is adapted to be maintained in fluid tight relation with said wall portion, the step which comprises covering a surface of said tubular portion insert adapted to extend transversely through said wall portion of said bag with a layer of an unvulcanized compound of said copolymer over said surface, and a plurality of tension members to force said layer strongly against the external surface of said member and to form a composite insert, and thereafter vulcanizing the said layer of said composite insert to the rubbery copolymer forming the wall portion of said bag, whereby said tension members hold said compounded rubbery copolymer strongly to the surface of said insert and the tendency for separation is reduced.

3. The method of claim 2 wherein the surface of said metal member extending through said wall portions is serrated.

4. The method of claim 1 wherein said tension members are formed of a plurality of turns of wire cord.

5. The air bag of claim 1 wherein the diolefinic compound is a conjugated diolefin of less than 8 carbon atoms, wherein said tension members are formed of a plurality of turns of a metal cable or cord.

6. The air bag of claim 1 wherein a surface of said solid insert is serrated to provide grooves and said tension members are formed of a plurality of turns of stretch resistant material.

7. The method of claim 2 wherein two layers of tension members are disposed in said side walls to surround said surface, which layers are spaced from said surface and from each other and are formed of spaced turns of flexible metal cord or cable.

8. The method of claim 2 wherein a second layer of said compounded rubbery copolymer is superimposed over said tension members and a second series of tension members are applied over said second layer.

LAURENCE M. BAKER.

REFERENCES CITED

The following references are of record in the file of this patent:

UNITED STATES PATENTS

| Number | Name | Date |
|---|---|---|
| 1,952,424 | Day | Mar. 27, 1934 |
| 1,952,427 | Evans | Mar. 27, 1934 |
| 2,218,639 | Crowley | Oct. 22, 1940 |
| 2,305,412 | Frolich et al. | Dec. 15, 1942 |
| 2,318,376 | Crowley | May 4, 1943 |